US012590631B2

(12) United States Patent　(10) Patent No.:　US 12,590,631 B2
Glückler et al.　(45) Date of Patent:　Mar. 31, 2026

(54) METHOD AND CONTROL DEVICE FOR OPERATING A VEHICLE DRIVELINE

(71) Applicant: ZF Friedrichshafen AG, Friedrichshafen (DE)

(72) Inventors: Johannes Glückler, Friedrichshafen (DE); Christian Mittelberger, Ravensburg (DE); Stefan Spühler, Friedrichshafen (DE); Morten Scherpelz, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 152 days.

(21) Appl. No.: 18/240,530

(22) Filed: Aug. 31, 2023

(65) Prior Publication Data

US 2024/0068559 A1　Feb. 29, 2024

(30) Foreign Application Priority Data

Aug. 31, 2022　(DE) ..................... 10 2022 209 051.9

(51) Int. Cl.
　F16H 61/02　　(2006.01)
　F16H 59/14　　(2006.01)
　　　(Continued)

(52) U.S. Cl.
　CPC .........　F16H 61/0213 (2013.01); F16H 59/14 (2013.01); F16H 59/78 (2013.01);
　　　(Continued)

(58) Field of Classification Search
　CPC .... F16H 59/14; F16H 59/78; F16H 2059/148; F16H 2059/366; F16H 61/0213; F16H 61/0403; F16H 2061/0422
　See application file for complete search history.

(56)　References Cited

U.S. PATENT DOCUMENTS

| | | | |
|---|---|---|---|
| 2,037,126 A | 4/1936 | Ford | |
| 5,879,265 A | 3/1999 | Bek | |

(Continued)

FOREIGN PATENT DOCUMENTS

| | | |
|---|---|---|
| CN | 201720039828 U | 12/2017 |
| CN | 201711214758 A | 5/2018 |

(Continued)

OTHER PUBLICATIONS

United States Patent and Trademark Office, Notice of Allowance issued in U.S. Appl. No. 18/192,044 (Oct. 1, 2024).

(Continued)

*Primary Examiner* — Edwin A Young
(74) *Attorney, Agent, or Firm* — Finch & Maloney PLLC

(57)　ABSTRACT

A vehicle powertrain features a first electrical machine with first power electronics, a second electrical machine with second power electronics, and a transmission connected between the electrical machines and an output. To execute a powershift, the first and second electrical machines are operated so that one of the electrical machines is used as the main drive machine, and the other electrical machine is used for tractive force support during the execution of the powershift. When a temperature of at least one of the electrical machines and/or of at least one of the power electronics exceeds a temperature limit value, and/or when a target electric current flowing through at least one of the electrical machines and/or at least one of the power electronics exceeds a current limit value, a powershift is adapted to limit heating of the respective electrical machine and/or the respective power electronics.

10 Claims, 2 Drawing Sheets

(51) Int. Cl.
    *F16H 59/78*         (2006.01)
    *F16H 61/04*         (2006.01)
    *F16H 59/36*         (2006.01)

(52) U.S. Cl.
    CPC ... *F16H 61/0403* (2013.01); *F16H 2059/148*
        (2013.01); *F16H 2059/366* (2013.01); *F16H*
        *2061/0422* (2013.01)

(56) References Cited

U.S. PATENT DOCUMENTS

| | | | |
|---|---|---|---|
| 6,557,656 | B2 | 5/2003 | Haniu et al. |
| 7,220,203 | B2 | 5/2007 | Holmes et al. |
| 7,363,996 | B2 | 4/2008 | Kamada et al. |
| 7,387,585 | B2 | 6/2008 | Bucknor et al. |
| 7,479,081 | B2 | 1/2009 | Holmes |
| 7,594,869 | B2 | 9/2009 | Holmes |
| 7,695,387 | B2 | 4/2010 | Oba |
| 7,967,711 | B2 | 6/2011 | Conlon et al. |
| 8,091,661 | B2 | 1/2012 | Oba et al. |
| 8,512,187 | B2 | 8/2013 | Puiu et al. |
| 8,528,676 | B2 | 9/2013 | Endo et al. |
| 9,566,857 | B1 | 2/2017 | Pritchard et al. |
| 10,968,983 | B2 | 4/2021 | Hara et al. |
| 11,002,350 | B2 | 5/2021 | Waltz |
| 11,124,064 | B2 | 9/2021 | Kaltenbach et al. |
| 11,156,280 | B2 | 10/2021 | Kurth |
| 11,364,784 | B2 | 6/2022 | Kaltenbach et al. |
| 11,365,785 | B2 | 6/2022 | Kumar et al. |
| 11,472,277 | B2 | 10/2022 | Glückler |
| 2006/0025263 | A1 | 2/2006 | Sowul et al. |
| 2009/0036263 | A1* | 2/2009 | Iwase ................. B60W 30/194 |
| | | | 477/3 |
| 2009/0082154 | A1* | 3/2009 | Iwase .................... B60K 6/547 |
| | | | 903/945 |
| 2011/0259657 | A1 | 10/2011 | Fuechtner |

| | | | |
|---|---|---|---|
| 2020/0400217 | A1* | 12/2020 | Billich ................... F16H 3/006 |
| 2021/0188066 | A1 | 6/2021 | McGrew et al. |
| 2021/0372506 | A1 | 12/2021 | McGrew, Jr. et al. |
| 2022/0186468 | A1 | 6/2022 | Glöckner et al. |
| 2022/0364631 | A1 | 11/2022 | Glückler |
| 2022/0409500 | A1 | 12/2022 | Lechner |

FOREIGN PATENT DOCUMENTS

| | | |
|---|---|---|
| CN | 208630340 U | 3/2019 |
| DE | 1505723 | 7/1970 |
| DE | 10 2011 088 647 A1 | 6/2013 |
| DE | 10 2012 204 717 A1 | 9/2013 |
| DE | 10 2012 219 125 | 4/2014 |
| DE | 10 2015 215 393 A1 | 9/2016 |
| DE | 10 2018 001 508 B3 | 5/2019 |
| DE | 10 2017 011 387 A1 | 6/2019 |
| DE | 10 2020 203 669 A1 | 9/2021 |
| DE | 10 2020 215 124 A1 | 6/2022 |
| DE | 10 2020 216 373 A1 | 6/2022 |
| EP | 3587157 B1 | 6/2021 |
| WO | 2019/115204 A1 | 6/2019 |
| WO | 2020/030212 A1 | 2/2020 |
| WO | 2021063789 A1 | 4/2021 |

OTHER PUBLICATIONS

German Patent Office, Search Report issued in German patent application No. 10 2022 209 051.9 (Mar. 29, 2023).
German Patent Office, Search Report issued in German patent application No. 10 2022 209 052.7 (Mar. 15, 2023).
German Patent Office, Search Report issued in German patent application No. 10 2022 209 050.0 (Jul. 24, 2023).
United States Patent and Trademark Office, Office Action issued in U.S. Appl. No. 18/192,018 (Sep. 25, 2023).
United States Patent Office, Ex Paite Quayle Action issued in U.S. Appl. No. 18/240,543 (mailed Oct. 29, 2025).

\* cited by examiner

METHOD AND CONTROL DEVICE FOR OPERATING A VEHICLE DRIVELINE

RELATED APPLICATIONS

This application claims the benefit of and right of priority under 35 U.S.C. § 119 to German Patent Application no. 10 2022 209 051.9, filed on 31 Aug. 2022, the contents of which are incorporated herein by reference in its entirety.

FIELD OF THE DISCLOSURE

The invention relates to a method for operating a powertrain of a vehicle. The invention further relates to a control device for operating a powertrain of a vehicle.

BACKGROUND

DE 10 2019 214 986 A1 and DE 10 2019 216 562 A1 each disclose a powertrain of a vehicle designed as an electrical vehicle with a first electrical machine and a second electrical machine, wherein a transmission is connected between the two electrical machines and an output on which both electrical machines act together. To execute a powershift in the transmission connected between the electrical machines and the output, one of the electrical machines is operated as the main drive machine, whereas the respective other electrical machine is used for traction support during the shift operations. Such powershifts are also called electrodynamic shifts.

When powershifts or electrodynamic shifts are executed, the electrical machines are operated asymmetrically, i.e., the electrical machines are loaded with different torques and/or different torque gradients. In the embodiment of an electrodynamic shift, a relatively high torque may be required from at least one electrical machine, especially when short shift durations are required. To provide high torques, high electrical currents flow through the windings of the electrical machine. High electrical currents cause high losses, especially in the power electronics of the electrical machine. This can expose the electrical machine and the power electronics interacting with the electrical machine to strong heating. Strong heating leads to large temperature swings, which reduce the service life of the electrical machine as well as the power electronics. This is a disadvantage.

SUMMARY

There is a need for a method and a control device for operating a powertrain of a vehicle, with which it is possible to reduce the negative effect of electrodynamic shifts or powershifts on the service life of the electrical machines as well as the power electronics interacting with the electrical machines. Proceeding from this, the invention is based on the task of creating a novel method and control unit for operating a powertrain of a vehicle.

This task is solved by a method as disclosed herein. According to the invention, if an actual temperature of at least one of the electrical machines and/or an actual temperature of at least one of the power electronics is greater than a temperature limit value, and/or if an electrical target current flowing through at least one of the electrical machines and/or at least one of the power electronics in a powershift to be executed is greater than a current limit value, a powershift to be executed is adapted in order to limit heating of the respective electrical machine and/or the respective power electronics.

With the invention, it is proposed that when an actual temperature at an electrical machine and/or power electronics is greater than a temperature limit value, and/or when a target electrical current flowing through an electrical machine and/or power electronics to execute the powershift is greater than a current limit value, the powershift to be executed is adjusted. This adjustment takes place in such a way that heating of the respective electrical machine and/or the respective power electronics is limited in order to avoid excessive aging of the same.

The actual temperature of the respective electrical machine and/or the respective power electronics, which the same exhibits prior to the execution of a powershift to be carried out, can in particular be recorded by measurement or calculated using temperature models or determined as a function of the characteristic diagram or characteristic curve.

The target current that would flow through a respective electrical machine and/or through a respective power electronics during execution of a powershift to be executed can be calculated depending on the torques of the electrical machine required for execution of the shift or determined depending on the characteristic diagram or characteristic curve.

Preferably, the powershift to be executed is adapted in such a way that a supporting torque at the output and/or a synchronizing torque at a shift element to be synchronized is limited. By limiting the supporting torque at the output and/or the synchronizing torque at the switching element to be synchronized, the adaptation of a powershift to be executed can be carried out particularly advantageously to limit the heating of the respective electrical machine and/or the respective power electronics.

Preferably, to limit the synchronization torque at the switching element to be synchronized during the execution of the powershift, a switching duration of the powershift is extended, in particular in such a way that for the execution of an upshift the same is triggered as early as possible and/or for the execution of a downshift the same is triggered as late as possible. This is preferred to limit the synchronizing torque on the switching element to be synchronized when the powershift is executed.

Preferably, a driver's desired torque is adapted to limit the supporting torque of the powershift. The supporting torque can be reduced to zero, in which case the powershift to be executed is not executed as powershifting but as tension interruption. In particular, the supporting torque is reduced to zero if a target torque amount to be transmitted during shift execution is smaller than a limit value. This is preferred to limit the support torque at the output. If only a relatively small amount of supporting torque is to be transmitted in the direction of the output during powershift, i.e., if the target torque to be transmitted during shifting is less than a limit value, then the powershift can also be designed as a tractive force interrupted switching without any loss of quality for the driver.

Preferably, the powershift to be executed is adapted in such a way that an electrical phase current and/or a maximum torque of the respective electrical machine is limited at speeds of the respective electrical machine that are lower than a speed limit value. This further development of the invention is based on the knowledge that high external conductor currents are particularly harmful at low speeds of an electrical machine since they then cause high heating of the electrical machine and the power electronics interacting with it. Therefore, at low speeds of an electrical machine, an external conductor current and thus a maximum torque of the electrical machine is limited.

The control device according to the invention is defined the present disclosure.

BRIEF DESCRIPTION OF THE DRAWINGS

Preferred further embodiments be apparent from the following description. Examples of embodiments of the invention are explained in more detail, without being limited thereto, by reference to the drawing. It shows.

DETAILED DESCRIPTION

Figure 1:
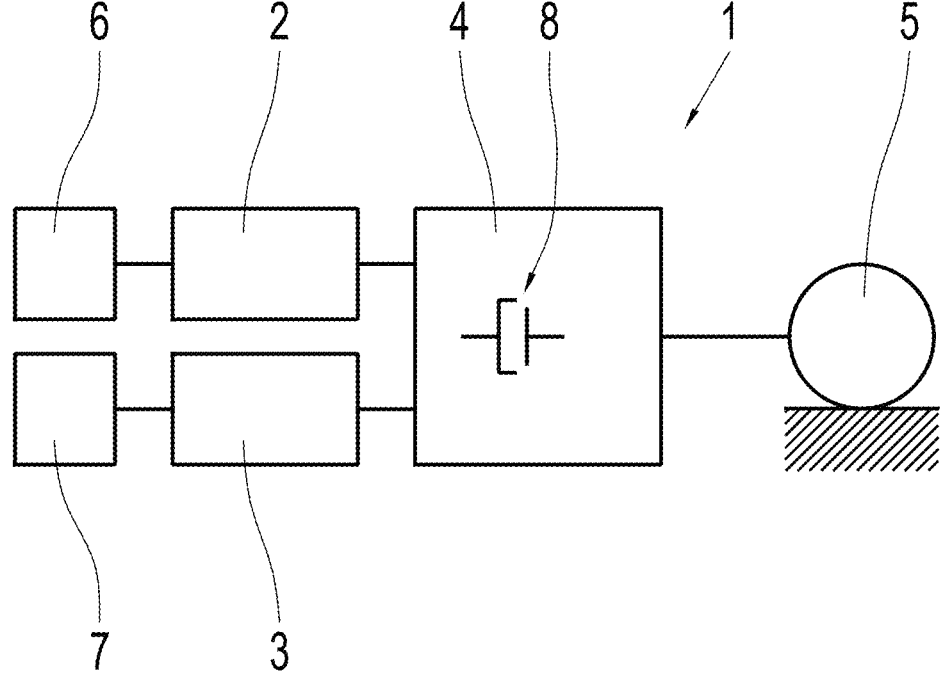
FIG. 1: a block diagram of a powertrain of a prior art vehicle.

FIG. 1 shows a highly schematized block diagram of a powertrain 1 of a motor vehicle designed as an electrical vehicle. The powertrain 1 has a first electrical machine 2 and a second electrical machine 3, whereby both electrical machines 2, 3 are operatively connected to a common transmission 4 and can provide input power to a common output 5 via the common transmission 4. A first power electronics 6 interacts with the first electrical machine 2, and a second power electronics 7 interacts with the second electrical machine 3. The transmission 4 has several shift elements 8. FIG. 1 shows an example of a shift element 8 of the transmission 4, which is designed as a positive shift element, in particular as a claw.

In this context, the powertrain of FIG. 1 can be designed as shown in DE 10 2019 214 286 A1 or as shown in DE 10 2019 2016 562 A1. However, these powertrain configurations are exclusively exemplary.

Figure 2:
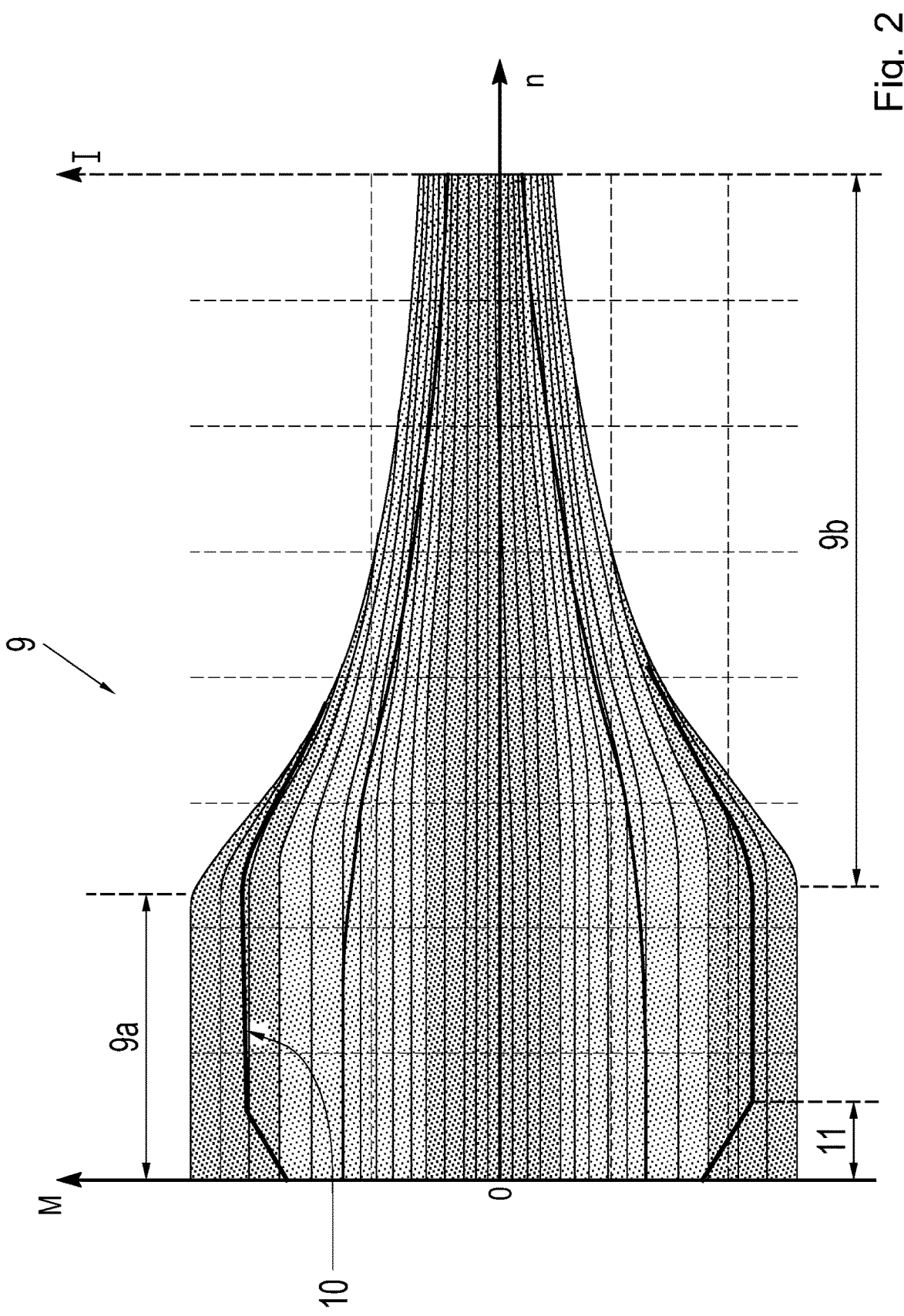
FIG. 2: a characteristic diagram of an electrical machine.

FIG. 2 shows a characteristic diagram 9 of an electrical machine, where the torque M is plotted above the speed n in the characteristic diagram 9. A characteristic diagram range 9a of characteristic diagram 9 is referred to as the base speed range or constant torque range. A characteristic diagram range 9b of characteristic diagram 9 is referred to as the field weakening range or constant power range of diagram 9. FIG. 2 further shows a characteristic 10 of an electrical phase current. In the characteristic diagram range 9a, high phase currents flow at the respective electrical machine.

Then, when a shift and thus a gear change is to be performed in the transmission 4, at least one previously closed shift element must be opened and at least one previously opened shift element must be closed and synchronized. Shifts can be designed as powershifts or as traction-interrupted shifts. When a powershift is executed, a torque is to be provided at the output 5 during the shift execution in the transmission 4. When a traction interrupted shift is executed, no torque is provided at the output 5 during the execution of a shift in the transmission 4. Then, when a powershift is to be executed in the transmission 4 as a shift, one of the electrical machines 6, 7 is used as the main driving machine, whereas the other of the electrical machines 6, 7 is used for traction support during the execution of the powershift. Such a powershift is also called an electrodynamic shift. Electrodynamic shifts can demand high torques from at least one electrical machine 2, 3, particularly if a fast shift design with a high supporting torque at the output 5 is desired, as a result of which the respective electrical machine 2, 3 and the respective power electronics 6, 7 interacting with the same are then subjected to a high thermal load or heating. This can cause high temperature swings on the respective assembly, which limits the service life of the powertrain.

According to the invention, when a powershift is to be executed in the transmission 4, and when an actual temperature of at least one of the electrical machines 2, 3 and/or an actual temperature of at least one of the power electronics 6, 7 is greater than a temperature limit value, and/or when a target electrical current flowing during the powershift to be executed, at least one of the electrical machines 2, 3 and/or at least one of the power electronics 6, 7 is greater than a current limit value, an executing powershift is adapted to limit heating of the respective electrical machine 2, 3 and/or the respective power electronics 6, 7.

Thus, if an actual temperature at an electrical machine 2, 3 and/or at a power electronics 6, 7 is too high, and/or if the expected heating of an electrical machine 2, 3 and/or at least one power electronics 6, 7 is too high as a result of the electrical target current, the powershift to be executed is adapted in order to limit the heating of the respective electrical machine 2, 3 and/or the respective power electronics 6, 7. In order to adapt a powershift to be executed, a supporting torque at the output 5, which is to be provided at the output 5 when the powershift is executed, and/or a synchronizing torque at the shift element 8 of the transmission 4 to be synchronized when the powershift is executed, is preferably limited.

To limit the synchronization torque at the switching element 8 to be synchronized when executing the powershift to be performed, a shift duration of the powershift to be performed is preferably extended, in particular in such a way that the shift is triggered as early as possible when executing an upshift to be performed and the powershift is triggered as late as possible when executing a downshift to be performed, such that the smallest possible speed difference has to be adapted and consequently less synchronization torque is required for synchronization. This can counteract the heating of the respective electrical machine 2, 3 and the respective power electronics 6, 7.

Alternatively, or additionally, it is possible to reduce the supporting torque of the powershifting at the output 5 in order to adapt a powershifting to be executed, namely by adapting a driver's desired torque. If the supporting torque at the output 5 is limited, it can be reduced to zero, in which case the powershifting to be executed is no longer executed as powershifting but as traction interruption.

Thus, it is possible that if the target torque to be transmitted during shifting and thus a target support torque at output 5 is less than a limit value, the powershifting to be performed can no longer be performed as powershifting but as traction interrupted, since in this case no torque is expected at output 5 by the driver anyway and thus the change from powershifting to traction interrupted shifting can be performed without any loss of shifting quality. This can also effectively limit the heating of the electrical machine 2, 3 and/or the respective power electronics 6, 7.

Likewise, it is possible that the powershift to be executed is adapted in such a way that an electrical phase current and/or a maximum torque of the respective electrical machine 2, 3 is limited at speeds of rotation of the respective electrical machine 2, 3 that are lower than a speed limit value. This design is based on the knowledge that high external electrical conductor currents (see characteristic curve 10 in FIG. 2) are particularly harmful in electrical machines at low speeds, since this causes high heating, in particular on the associated power electronics 6, 7 of the respective electrical machine 2, 3. In this case, it is then proposed to limit external conductor currents at the electrical machine in particular at low speeds of an electrical machine in the characteristic diagram range 9a of characteristic diagram 9 of FIG. 2, which leads to a limitation of the maximum torque of the electrical machine. In the speed range 11 of FIG. 2, phase currents are limited. Although this may increase the shift duration, the temperature swing at the respective electrical machine 2, 3 and at the power electronics 6, 7 interacting with the respective electrical machine 2, 3 is limited and thus the thermal aging of the respective assembly.

The invention further relates to a control device which is set up to automatically execute the above-described method. Such a control unit is preferably an electronic control unit which has means on the hardware side and means on the software side for executing the method according to the invention. The hardware-side means include data interfaces for exchanging data with the assemblies involved in carrying out the method according to the invention, for example with the electrical machines 2, 3 and/or the power electronics 6, 7. The hardware means further include a processor for data processing and a memory for data storage. Software-side means include program modules implemented in the control unit for carrying out the method according to the invention.

Then, when the control unit detects that an actual temperature of at least one of the electrical machines 2, 3 and/or an actual temperature of at least one of the power electronics 6, 7 is greater than a temperature limit value, and/or when the control unit detects that a set electrical current, which flows through at least one of the electrical machines 2, 3 and/or at least one of the power electronics 6, 7 during a powershift to be executed is greater than a current limit value, the control unit adjusts a powershift to be executed in order to limit heating of the respective electrical machine 2, 3 and/or the respective power electronics 6, 7.

LIST OF REFERENCE NUMERALS

1 powertrain
2 electrical machine
3 electrical machine
4. transmission
5 output
6 power electronics
7 power electronics
8 shift element
9 characteristic diagram
9a characteristic diagram range
9b characteristic diagram range
10 external conductor current characteristic curve
11 speed range

The invention claimed is:

1. A method for operating a powertrain of a vehicle, wherein the powertrain features a first electrical machine with first power electronics, a second electrical machine with a second power electronics, and a transmission connected between the electrical machines and an output, the method comprising:

executing a powershift, wherein one of the first electrical machine and the second electrical machine is used as a main driving machine, and wherein the other of the first electrical machine and the second electrical machine is used for tractive force support during the execution of the powershift;

determining that an actual temperature of at least one of the electrical machines and/or an actual temperature of at least one of the power electronics is greater than a temperature limit value, and/or when a target electric current flowing through at least one of the electrical machines and/or at least one of the power electronics is greater than a current limit value; and adapting a powershift to be executed so as to limit heating of the respective electrical machine and/or the respective power electronics.

2. The method according to claim 1, wherein adapting the powershift to be executed includes limiting a supporting torque at the output and/or limiting a synchronizing torque at a switching element to be synchronized.

3. The method according to claim 2, wherein, limiting the synchronizing torque at the switching element to be synchronized includes extending a duration of the powershift during the execution of the powershift.

4. The method according to claim 3, wherein the powershift is an upshift and execution of the powershift includes triggering the upshift as early as possible.

5. The method according to claim 3, wherein the powershift is a downshift and execution of the powershift includes triggering the downshift as late as possible.

6. The method according to claim 2, comprising adapting a driver's desired torque to limit the supporting torque of the powershifting.

7. The method according to claim 2, comprising limiting the supporting torque to zero, and the powershifting to be executed is executed as tractive force interruption.

8. The method according to claim 7, comprising:

determining that a target torque amount to be transmitted during the shift execution is smaller than a limit value; and executing the powershift in a traction-interrupted manner.

9. The method according to claim 1, wherein executing the powershift is performed so that, at speeds of the respective electrical machine that are lower than a speed limit value, an electric phase current and/or a maximum torque of the respective electrical machine is limited.

10. A control unit of a vehicle, the control unit configured to automatically execute the method according to claim 1.

* * * * *